J. H. STANLEY
Sewer-Junction Indicator.
No. 166,314. 
Patented Aug. 3, 1875.
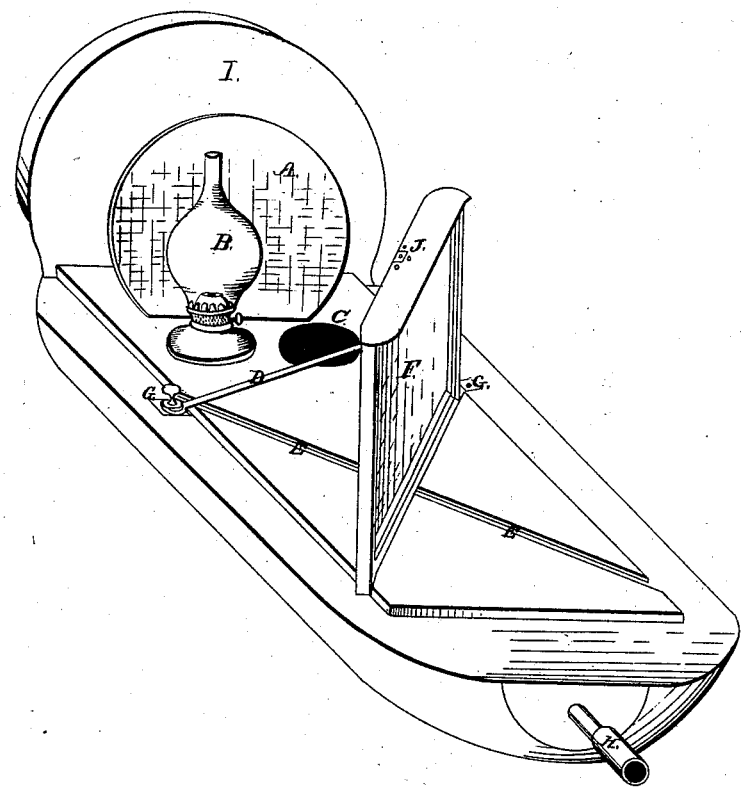

UNITED STATES PATENT OFFICE.

JOHN H. STANLEY, OF CHICAGO, ILLINOIS.

IMPROVEMENT IN SEWER-JUNCTION INDICATORS.

Specification forming part of Letters Patent No. 166,314, dated August 3, 1875; application filed May 24, 1875.

*To all whom it may concern:*

Be it known that I, JOHN H. STANLEY, of the city of Chicago, county of Cook and State of Illinois, have invented a Sewer-Junction Indicator, of which the following is a specification:

The extreme size of the indicator for the use in a twelve-inch pipe-sewer is nine and one-half inches in width, eighteen inches in length, and four inches in height.

In reference to the accompanying drawing, A represents the reflector, the diameter of which averages six inches. B represents the lamp; C, the holes to place the lamp to change the reflection accordingly from left to right; D, brace bracing the mirror; E, slides for mirror, changing its location accordingly; F, the mirror; G, screw-holes for fastening brace; H, screw-hole for connecting moving and measuring rods; I, protector; and J, mirror-protector.

The body of the indicator is composed of heavy zinc. The back of the mirror is protected with zinc, also the top of mirror covered with a piece of zinc rounded off at the corners and projecting over glass—say two inches. The size of the mirror is five by eight inches.

The protection of lamp and reflector consists of heavy zinc, being nine and one-half inches in height. The reflector is set into the body of indicator—say, three-quarter inch—and fastened in the back on a pivot.

The rods for moving and measuring the distance of junctions are to be five feet long, of hickory wood, three-quarter inch diameter, to be screwed together with the union gas-pipe coupling. The rod shows a mark every twelve inches.

How the indicator is applied: Starting at the man-hole, the indicator is first entered into the pipe-sewer and the rods screwed on as the indicator is moved along. The lamp, being located on the left side of the indicator, as shown on drawing, will throw, in connection with the reflector, the light on the right side of the sewer, and which will show in the mirror, which is placed diagonally, as indicated on drawing. The measurements are taken from the center of mirror in a right angle to the sides of the indicator, showing thus the junction one foot from the center of mirror to the end of screw-hole for rod-connection.

In measuring the distance of junctions on the left side of the sewer, the lamp will be placed in the right-side hole, and the mirror in the reverse side of that the mirror is placed in on the drawing.

I claim—

The sewer-junction indicator, consisting of a float supporting a lamp and reflectors adjustably arranged thereon, and operating substantially as and for the purposes set forth.

JOHN H. STANLEY.

Witnesses:
 WILLIAM LOWE,
 B. F. DAVENPORT.